(12) United States Patent  (10) Patent No.: US 11,712,030 B2
Hoium et al.  (45) Date of Patent: Aug. 1, 2023

(54) LURE STORAGE DEVICE

(71) Applicants: Ryan Hoium, Brookings, SD (US); Chase Plucker, Brookings, SD (US)

(72) Inventors: Ryan Hoium, Brookings, SD (US); Chase Plucker, Brookings, SD (US)

( * ) Notice: Subject to any disclaimer, the term of this patent is extended or adjusted under 35 U.S.C. 154(b) by 150 days.

(21) Appl. No.: 17/411,854

(22) Filed: Aug. 25, 2021

(65) Prior Publication Data

US 2022/0061290 A1 Mar. 3, 2022

Related U.S. Application Data

(60) Provisional application No. 63/073,971, filed on Sep. 3, 2020.

(51) Int. Cl.
*A01K 97/06* (2006.01)

(52) U.S. Cl.
CPC .................................. *A01K 97/06* (2013.01)

(58) Field of Classification Search
CPC ....................................................... A01K 97/06
USPC .................................................... 206/315.11
See application file for complete search history.

(56) References Cited

U.S. PATENT DOCUMENTS

| | | |
|---|---|---|
| 4,176,491 A | 12/1979 | Herring |
| 4,366,641 A | 1/1983 | Price |
| 4,827,658 A | 5/1989 | Wolniak |
| 6,789,669 B1 * | 9/2004 | Lin ........................ A01K 97/06 206/315.11 |
| 7,357,250 B2 | 4/2008 | Hagemann et al. |
| 7,621,074 B2 | 11/2009 | Glidewell |
| 8,468,740 B1 | 6/2013 | Ryckman |
| 9,913,463 B2 | 3/2018 | Aston |
| 10,299,468 B2 | 5/2019 | Aston |
| 10,433,533 B1 | 10/2019 | Aston |
| 2002/0079313 A1 | 6/2002 | Grayson |
| 2006/0053681 A1 | 3/2006 | Hoover |
| 2010/0170139 A1 * | 7/2010 | Zhou ....................... A01K 97/06 43/54.1 |
| 2016/0015017 A1 * | 1/2016 | Heaton ................... A01K 97/06 43/54.1 |
| 2017/0265448 A1 * | 9/2017 | Duffy ...................... A01K 97/06 |
| 2018/0007882 A1 * | 1/2018 | Langley .................. A01K 97/06 |
| 2021/0153488 A1 * | 5/2021 | White ...................... A01K 97/06 |
| 2021/0185995 A1 * | 6/2021 | Morash ................. B65D 25/108 |

* cited by examiner

*Primary Examiner* — Jacob K Ackun

(57) ABSTRACT

A lure storage device includes a tray having a bottom wall and a peripheral wall extending upwardly from a peripheral edge of the bottom wall defining an interior space of the tray. A support is positioned in the interior space of the tray. The support has an upper surface. Each of a plurality of depressions extends into the upper surface of the support. Each depression is shaped to abut a first lateral side of a respective fishing lure such that a second lateral side of the respective fishing lure is displayed on the tray. Each of one or more hook apertures extends into the support. Each hook aperture is positioned adjacent to and extending further into the support from an associated one of the depressions wherein each of the hook apertures is configured for receiving a hook from the respective fishing lure positioned on the associated one of the depressions.

16 Claims, 6 Drawing Sheets

LURE STORAGE DEVICE

CROSS-REFERENCE TO RELATED APPLICATIONS

I hereby claim the benefit under 35 U.S.C. Section 119(e) of U.S. Provisional application 63/073,971 filed Sep. 3, 2020.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to storage device and more particularly pertains to a new storage device for storing fishing lures in an orientation to facilitate visual identification of a lure without having to move or touch the lure.

(2) Description of Related Art Including Information Disclosed Under 37 CFR 1.97 and 1.98

The prior art relates to storage devices. The known storage devices for fishing lures lack secure support of fishing lures in an orientation displaying a lateral side of the fishing lure to facilitate identification of each stored fishing lure. The known devices also lack storage of hooks in a dedicated aperture oriented perpendicular to the orientation of the fishing lure such that the hook is positioned to minimize opportunity for accidental injury by a hook.

BRIEF SUMMARY OF THE INVENTION

An embodiment of the disclosure meets the needs presented above by generally comprising a tray having a bottom wall and a peripheral wall extending upwardly from a peripheral edge of the bottom wall defining an interior space of the tray. A support is positioned in the interior space of the tray. The support has an upper surface. Each of a plurality of depressions extends into the upper surface of the support. Each depression is shaped to abut a first lateral side of a respective fishing lure such that a second lateral side of the respective fishing lure is displayed on the tray. Each of one or more hook apertures extends into the support. Each hook aperture is positioned adjacent to and extending further into the support from an associated one of the depressions wherein each of the hook apertures is configured for receiving a hook from the respective fishing lure positioned on the associated one of the depressions.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
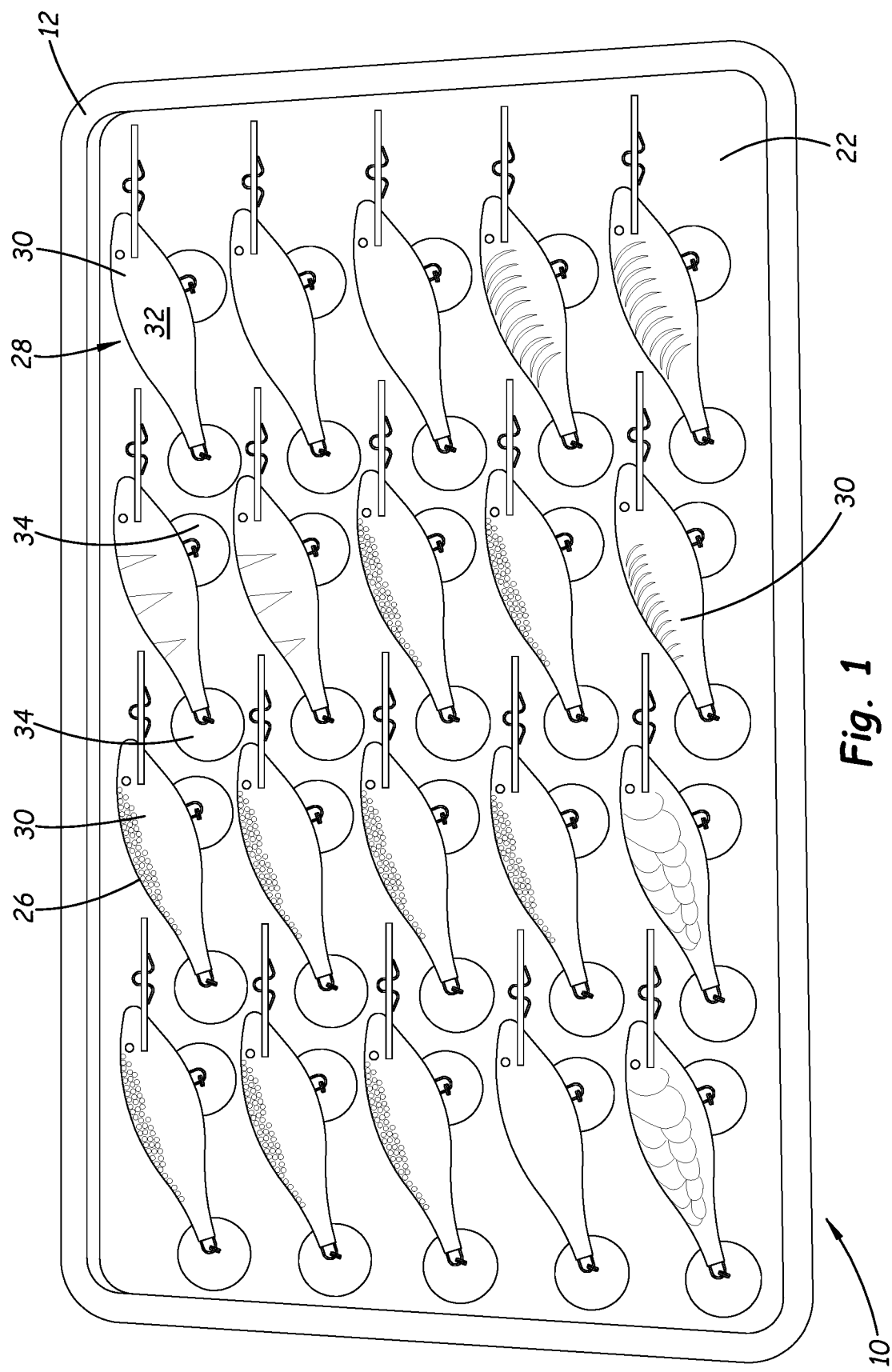
FIG. 1 is a top view of an embodiment of the disclosure.
Figure 2:
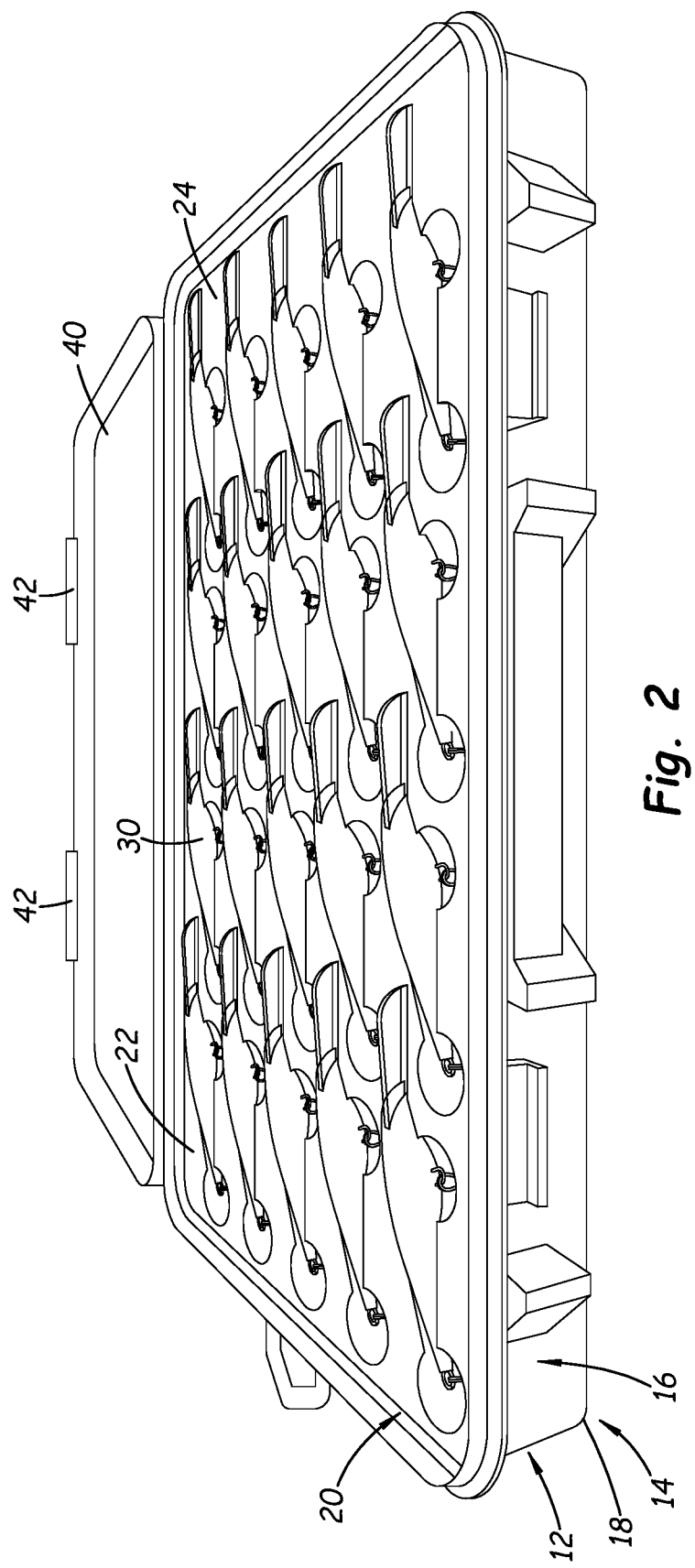
FIG. 2 is a front top perspective view of an embodiment of the disclosure.
Figure 3:
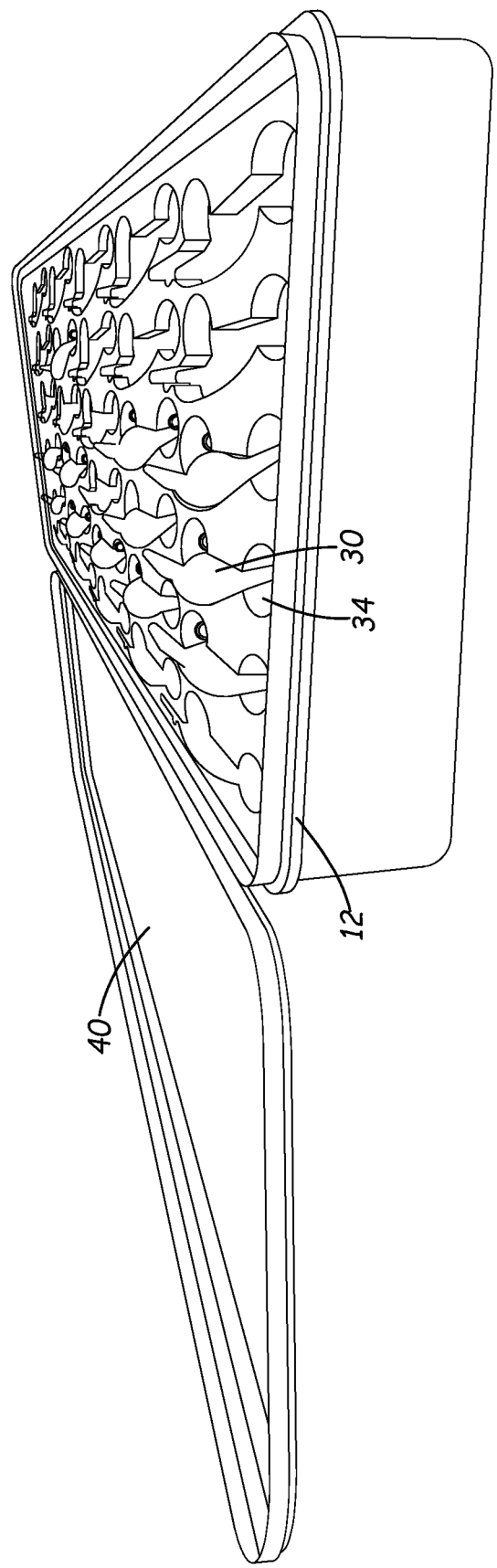
FIG. 3 is a side top perspective view of an embodiment of the disclosure.
Figure 4:
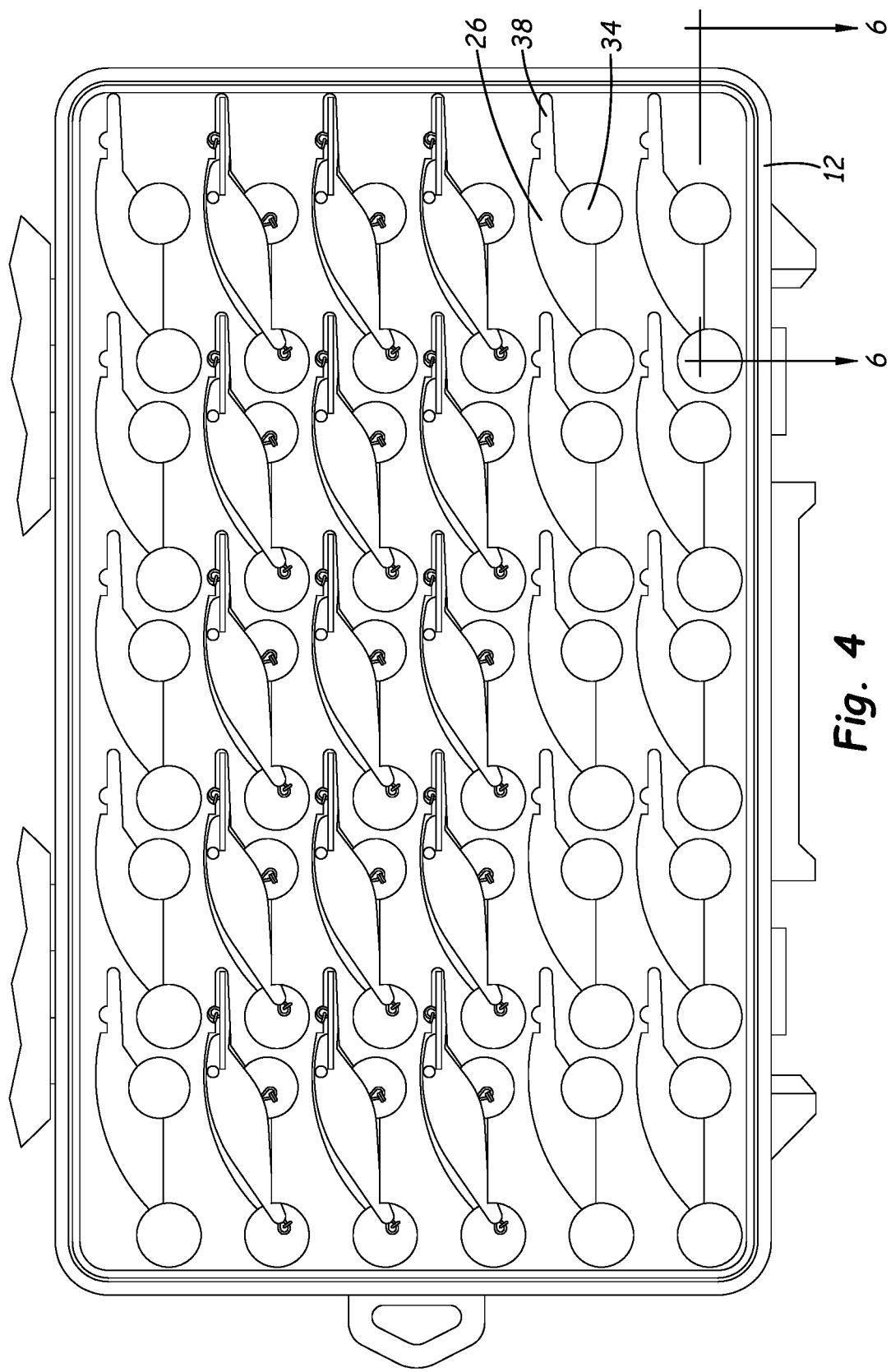
FIG. 4 is a top view of an embodiment of the disclosure.
Figure 5:
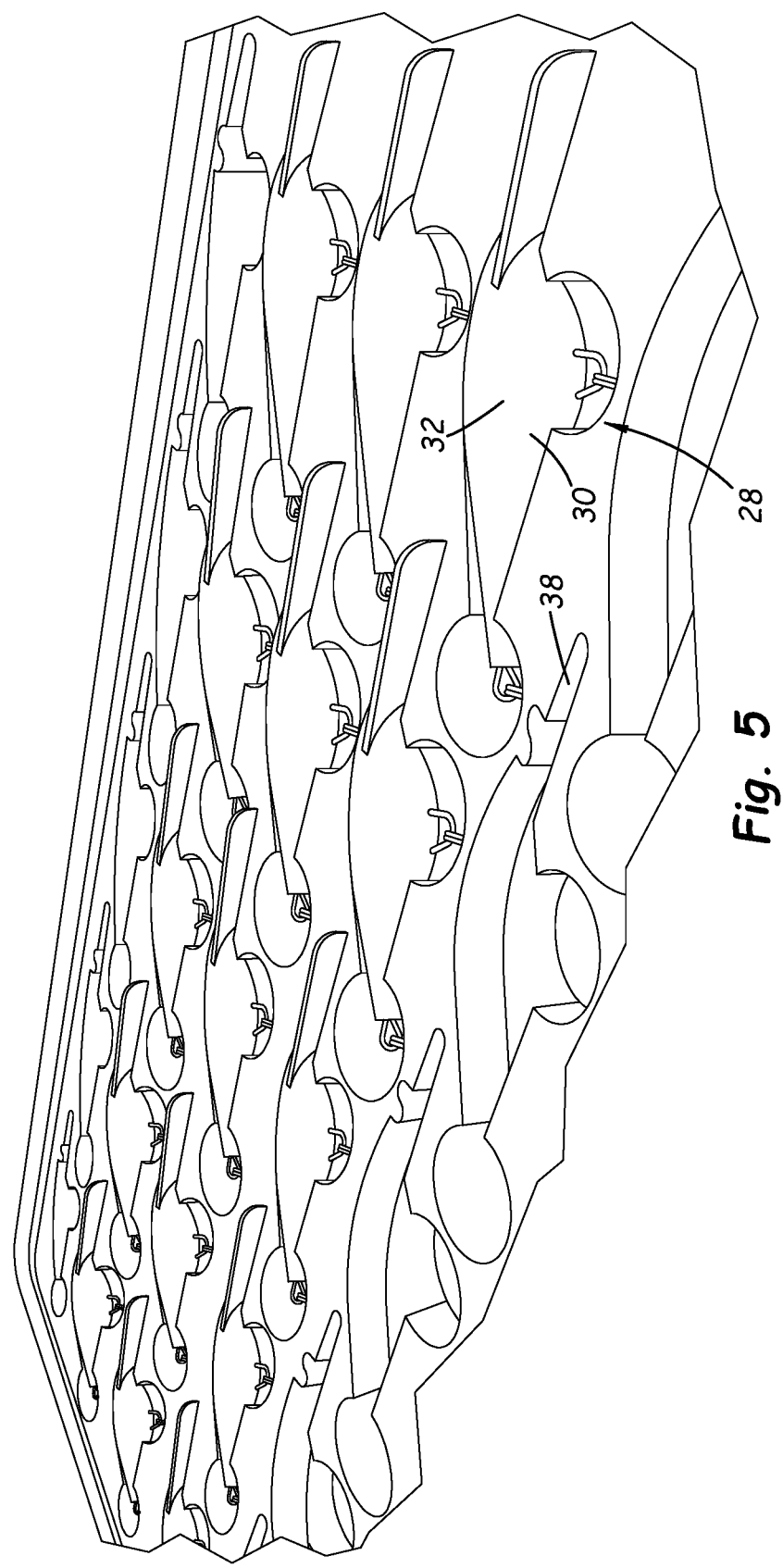
FIG. 5 is a partial top front side perspective view of an embodiment of the disclosure.
Figure 6:
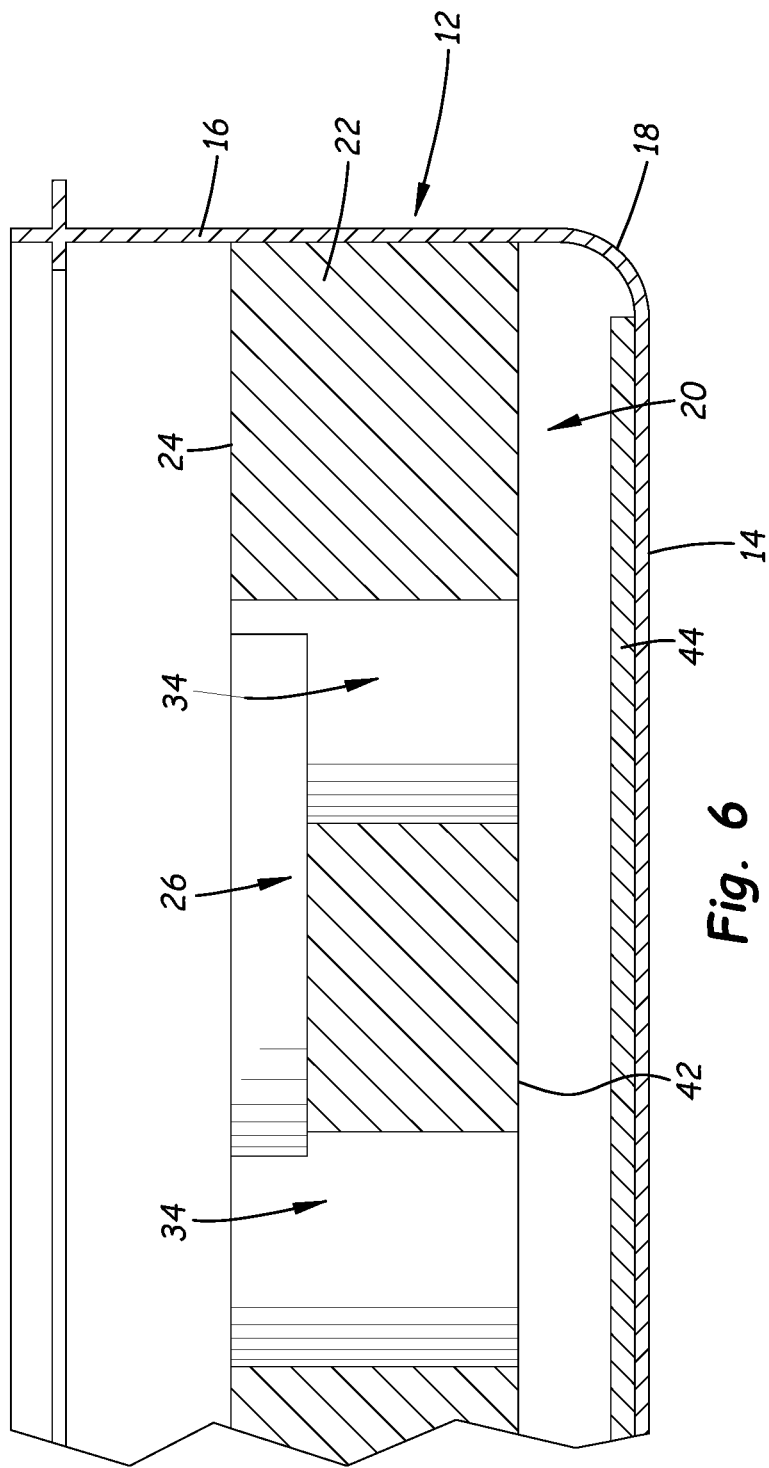
FIG. 6 is a partial cross-sectional front view of an embodiment of the disclosure taken along line 6-6 of FIG. 4.

With reference now to the drawings, and in particular to FIGS. 1 through 6 thereof, a new lure storage device embodying the principles and concepts of an embodiment of the disclosure and generally designated by the reference numeral 10 will be described.

As best illustrated in FIGS. 1 through 6, the lure storage device 10 generally comprises a tray 12 having a bottom wall 14 and a peripheral wall 16 extending upwardly from a peripheral edge 18 of the bottom wall 14 defining an interior space 20 of the tray 12. In the attached written supporting materials the tray 12 may be called a container. This derives from contemplation that the tray 12 may be used as a tray in part of a larger container or may be part of a stand alone container. A support 22 is positioned in the interior space 20 of the tray 12. The support 22 has an upper surface 24. Each of a plurality of depressions 26 extends into the upper surface 24 of the support 22. Each depression 26 is shaped to abut a first lateral side 28 of a respective fishing lure 30 such that a second lateral side 32 of the respective fishing lure 30 is displayed on the support 22 within the tray 12. Each of either one or a plurality of hook apertures 34 extends into the support 22. Each hook aperture 34 is positioned adjacent to and extending further into the support 22 from an associated one of the depressions 26 wherein each of the hook apertures 34 is configured for receiving a hook 36 from the respective fishing lure 30 positioned on the associated one of the depressions 26.

Each depression 26 may have a front projection 38 to receive a portion of the fishing lure 30 in a firm manner to prevent the fishing lure 30 from moving significantly when the fishing lure 30 is positioned in the depression 26. Each depression 26 may be structured to angle a front of the fishing lure 30 upwardly relative to a back of the fishing lure 30. The number of hook apertures 34 may be different than shown and the specific shape of each depression 26 may be changed to conform to specific shapes and numbers of hooks on specific fishing lures. Each hook aperture 34 is cylindrical, having an oval or circular cross-sectional shape perpendicular to a central axis of the hook aperture 34, to receive a fishing hook having one or more hook members with three radially arranged barbed hook members being typical. Each hook aperture 34 may be essentially perpendicular to the bottom wall 14 of the tray 12 or angled. Each hook aperture may also extend fully through the support to allow air flow through the hook aperture to facilitate drainage and drying of the hook within the hook aperture. The support 22 may be positioned in a manner spacing a lower surface of the support 22 from the bottom wall 16 of the tray 12 to prevent drainage from collecting adjacent to the hooks of stored fishing lures 30. Further, each hook aperture 34 is sized to allow for free suspension of the associated hook within the hook aperture 34. This prevents the hook from contacting the sidewall of the hook aperture in a fixed position to prevent collection of water against the hook. The spacing is slight enough to prevent significant movement of the hook within the hook aperture such that each hook maintains perpendicular orientation relative to the body of the fishing lure.

The depressions 26 are arranged to maximize storage of fishing lures 30 within the interior space 20 while maintaining spacing to prevent contact between fishing lures 30 while stored.

The tray 12 may comprise a generally conventional storage tray having a lid 40 which may be completely removable, attached to the tray by a living hinge or the like, or attached by a coupling allowing the lid to be secured to the tray in both open and closed positions while also allowing selective full removal of the lid from the tray if desired. The lid may provide a waterproof seal with the tray and the tray and lid combined may provide a water tight enclosure of the interior space or there may be vents provided in either the tray or the lid to allow for free air flow if so desired. A water absorbent pad, wick, or the like may be positioned in the tray in the space between the support and the bottom wall to absorb drainage from the fishing lures and prevent the hooks from sitting in water while stored. The lid may be provided with a locking mechanism 42 or may frictionally engage the tray to hold the lid on the tray.

The material of the support 22 such as crosslinked polyethylene foam or the like may be used to conform to the shape of the fishing lure 30 and facilitate buoyancy such that the tray 12 and support 22 will float if dropped into water, particularly when the lid 40 is on the tray 12.

In use, a fishing lure is held in an upright position such that the hook or hooks hang from the body of the fishing lure. The hooks are positioned over the hook apertures and the fishing lure is lowered to position the hook or hooks within the associated hook apertures. The body of the fishing lure is then pivoted to be positioned in the depression for storage. The fishing lure is removed by grasping the body of the fishing lure to pivot it away from the support out of the depression. The fishing lure is then lifted perpendicularly away from the support lifting the hook or hooks out of the hook apertures.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A lure storage device comprising:
   a tray having a bottom wall and a peripheral wall extending upwardly from a peripheral edge of said bottom wall defining an interior space of said tray;
   a support positioned in said interior space of said tray, said support having an upper surface;
   a plurality of depressions into said upper surface of said support, each depression being shaped such that said depressions are configured to abut a first lateral side of a respective fishing lure such that a second lateral side of the respective fishing lure is displayed on said tray; and
   a plurality of hook apertures extending into said support, each hook aperture being positioned adjacent to and extending further into said support from an associated one of said depressions wherein each of said hook apertures is configured for receiving a hook from the respective fishing lure positioned on the associated one of said depressions.

2. The device of claim 1, further comprising each depression having a front projection configured to snugly receive a portion of the fishing lure to prevent the fishing lure from moving when the fishing lure is positioned in the depression.

3. The device of claim 1, further comprising each depression being structured wherein each depression is configured to angle a front of the fishing lure upwardly relative to a back of the fishing lure.

4. The device of claim 1, further comprising each hook aperture being cylindrical extending perpendicular to the bottom wall of the tray.

5. The device of claim 1, further comprising each hook aperture being cylindrical extending at a non-right angle from the bottom wall of the tray.

6. The device of claim 1, further comprising each hook aperture having a cross-sectional shape perpendicular to a central axis of the hook aperture, the cross-sectional shape being one shape chosen from a group of shapes consisting of circular and oval.

7. The device of claim 1, further comprising each hook aperture extending fully through the support.

8. The device of claim 1, further comprising the support having a lower surface, the lower surface being spaced from the bottom wall of the tray.

9. The device of claim 1, further comprising each hook aperture having an inner size wherein an interior surface of the hook aperture is configured to be spaced slightly from the hook positioned in the hook aperture.

10. The device of claim 1, further comprising a lid coupled to the tray.

11. The device of claim 10, wherein the lid is fully removable from the tray.

12. The device of claim 10, wherein the lid forms a waterproof seal with the tray when the lid is in a closed position on the tray.

13. The device of claim 8, further comprising a pad, the pad being water absorbent, the pad being positionable between the lower surface of the support and the bottom wall of the tray.

14. The device of claim 1, further comprising the support being constructed of a buoyant material wherein the tray and support are configured to float if the tray and support are dropped in water.

15. The device of claim 14 wherein the support is constructed of a crosslinked polyethylene foam.

16. A lure storage device comprising:
- a tray having a bottom wall and a peripheral wall extending upwardly from a peripheral edge of said bottom wall defining an interior space of said tray;
- a support positioned in said interior space of said tray, said support having an upper surface, the support having a lower surface, the lower surface being spaced from the bottom wall of the tray, the support being constructed of a buoyant material wherein the tray and support are configured to float if the tray and support are dropped in water, the support being constructed of a crosslinked polyethylene foam;
- a plurality of depressions into said upper surface of said support, each depression being shaped such that said depressions are configured to abut a first lateral side of a respective fishing lure such that a second lateral side of the respective fishing lure is displayed on said tray, each depression having a front projection configured to snugly receive a portion of the fishing lure to prevent the fishing lure from moving when the fishing lure is positioned in the depression, each depression being structured wherein each depression is configured to angle a front of the fishing lure upwardly relative to a back of the fishing lure; and
- a plurality of hook apertures extending into said support, each hook aperture being positioned adjacent to and extending further into said support from an associated one of said depressions wherein each of said hook apertures is configured for receiving a hook from the respective fishing lure positioned on the associated one of said depressions, each hook aperture being cylindrical extending perpendicular to the bottom wall of the tray, each hook aperture being cylindrical extending at a non-right angle from the bottom wall of the tray, each hook aperture having a cross-sectional shape perpendicular to a central axis of the hook aperture, the cross-sectional shape being one shape chosen from a group of shapes consisting of circular and oval, each hook aperture extending fully through the support, each hook aperture having an inner size wherein an interior surface of the hook aperture is configured to be spaced slightly from the hook positioned in the hook aperture;
- a lid coupled to the tray, the lid being fully removable from the tray, the lid forming a waterproof seal with the tray when the lid is in a closed position on the tray; and
- a pad, the pad being water absorbent, the pad being positionable between the lower surface of the support and the bottom wall of the tray.

* * * * *